(12) United States Patent
Rose

(10) Patent No.: US 7,451,920 B1
(45) Date of Patent: Nov. 18, 2008

(54) PORTABLE CREDIT CARD VERIFIER

(75) Inventor: Manning I. Rose, Kettering, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/673,642

(22) Filed: Jun. 25, 1996

(51) Int. Cl.
*G06K 5/00* (2006.01)

(52) U.S. Cl. .................... 235/380; 235/382

(58) Field of Classification Search .......... 235/380, 235/382, 382.5, 383, 381, 492, 493, 487
See application file for complete search history.

(56) References Cited

U.S. PATENT DOCUMENTS

| | | | |
|---|---|---|---|
| 4,341,951 A | 7/1982 | Benton | 235/379 |
| 4,454,414 A | 6/1984 | Benton | 235/379 |
| 4,759,078 A * | 7/1988 | Schiller | 455/49 |
| 4,812,632 A | 3/1989 | Kakinuma et al. | 235/379 |
| 4,877,947 A | 10/1989 | Mori | 235/381 |
| 5,050,207 A | 9/1991 | Hitchcock | 379/96 |
| 5,103,079 A * | 4/1992 | Barakai et al. | 235/380 |
| 5,157,717 A | 10/1992 | Hitchcock | 379/96 |
| 5,221,838 A * | 6/1993 | Gutman et al. | 235/379 |
| 5,272,319 A * | 12/1993 | Rey | 235/379 |
| 5,278,752 A * | 1/1994 | Narita et al. | 705/17 |
| 5,294,782 A | 3/1994 | Kumar | 235/462 |
| 5,322,991 A | 6/1994 | Hanson | 235/472 |
| 5,334,821 A * | 8/1994 | Campo et al. | 235/380 |
| 5,334,824 A | 8/1994 | Martinez | 235/380 |
| 5,473,143 A * | 12/1995 | Vak et al. | 235/379 |
| D374,675 S * | 10/1996 | Sakai et al. | D14/242 |
| 5,614,703 A * | 3/1997 | Martin et al. | 235/382 |
| 5,663,547 A * | 9/1997 | Ziarno | 235/380 |
| 5,682,605 A * | 10/1997 | Salter | 455/54.1 |
| 5,689,547 A * | 11/1997 | Molne | 379/58 |
| 5,729,542 A * | 3/1998 | Dupont | 370/346 |

* cited by examiner

*Primary Examiner*—Thien M Le
(74) *Attorney, Agent, or Firm*—Gregory A. Welte (57) ABSTRACT

A portable credit card reader. A portable terminal reads a credit card, and accepts a keyed-in monetary amount. The terminal communicates with a credit card verification service, which accepts or rejects the monetary amount. The communication is done in a wireless manner. The terminal is self-teaching, allowing persons unfamiliar with its operation to successfully execute a credit card transaction without previous training.

16 Claims, 8 Drawing Sheets

PORTABLE CREDIT CARD VERIFIER

The invention concerns a portable, wireless, device which (1) reads an identification number from a credit card, (2) connects with a verification service, (3) inquires whether a given monetary amount can be added to the credit card account, and (4) requests the amount be added to the account.

BACKGROUND OF THE INVENTION

Restaurant patrons frequently use credit cards to pay for meals and, in doing so, commonly experience the following sequence of events.

First, a waiter delivers a bill to the patron. Next, the patron hands a credit card to the waiter. Then, the waiter disappears with both bill and credit card, makes a telephone call to verify whether the credit card account will accommodate addition of the restaurant bill, and, if so, returns with a receipt for the patron to sign. If not, the waiter returns instead with solemn news, and request an alternate means of payment.

Several disadvantages exist with this type of transaction. One stems from the patron's relinquishment of possession of the credit card, which can cause a slight amount of anxiety in some patrons. This anxiety can be heightened if the waiter forgets to return it.

A second disadvantage is the delay involved: the waiter, in collecting the bill, makes five trips:

one trip to deliver the bill;
a second trip to obtain the credit card from the patron;
a third trip to make the telephone call;
a fourth trip to return the credit card to the patron, with a receipt for signing; and
a fifth trip to file the receipt.

As a rough estimate, these trips probably represent ⅕ to ½ the total number of trips made by the waiter to the patron's table. If these trips can be reduced in number, the waiters can perhaps devote the time recovered to better service.

A third disadvantage is the requirement of informing a patron that a credit card charge has been declined, which serves to embarrass the patron.

Patents exist on communication devices which allow a waiter to perform a credit card transaction at the patron's table. However, many of these devices are complicated to learn to use. One of the reasons for this difficulty is that a large number of features are packed into the device, requiring a large amount of time to master them all. They also require expensive equipment.

OBJECTS OF THE INVENTION

An object of the invention is to provide an improved credit card verification terminal.

A further object of the invention is to provide a credit card verification terminal which implements a minimal set of features, and is easy to learn to use, to the point of being self-explanatory.

SUMMARY OF THE INVENTION

In one form of the invention, a portable terminal issues prompts to a user, requesting (1) presentation of a credit card, and (2) entry of a monetary amount. When the customer complies with the prompts, the terminal transmits both (1) data obtained from the card and (2) the monetary amount, in a wireless manner, to a remote agency, which accepts or rejects the monetary amount as a charge against the credit card account.

DETAILED DESCRIPTION OF THE INVENTION

Figure 1:
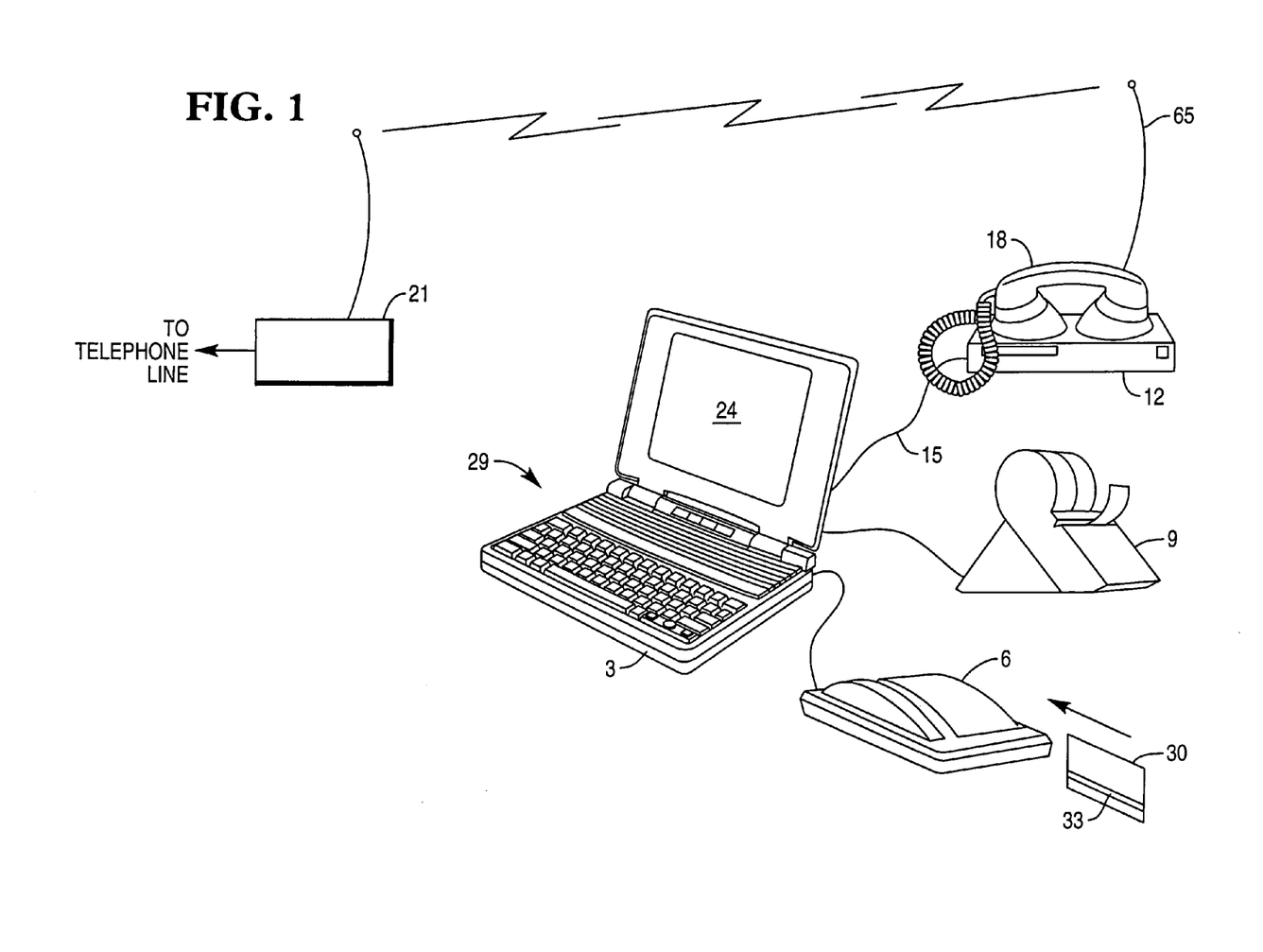
FIG. 1 illustrates one form of the invention.
Figure 3:
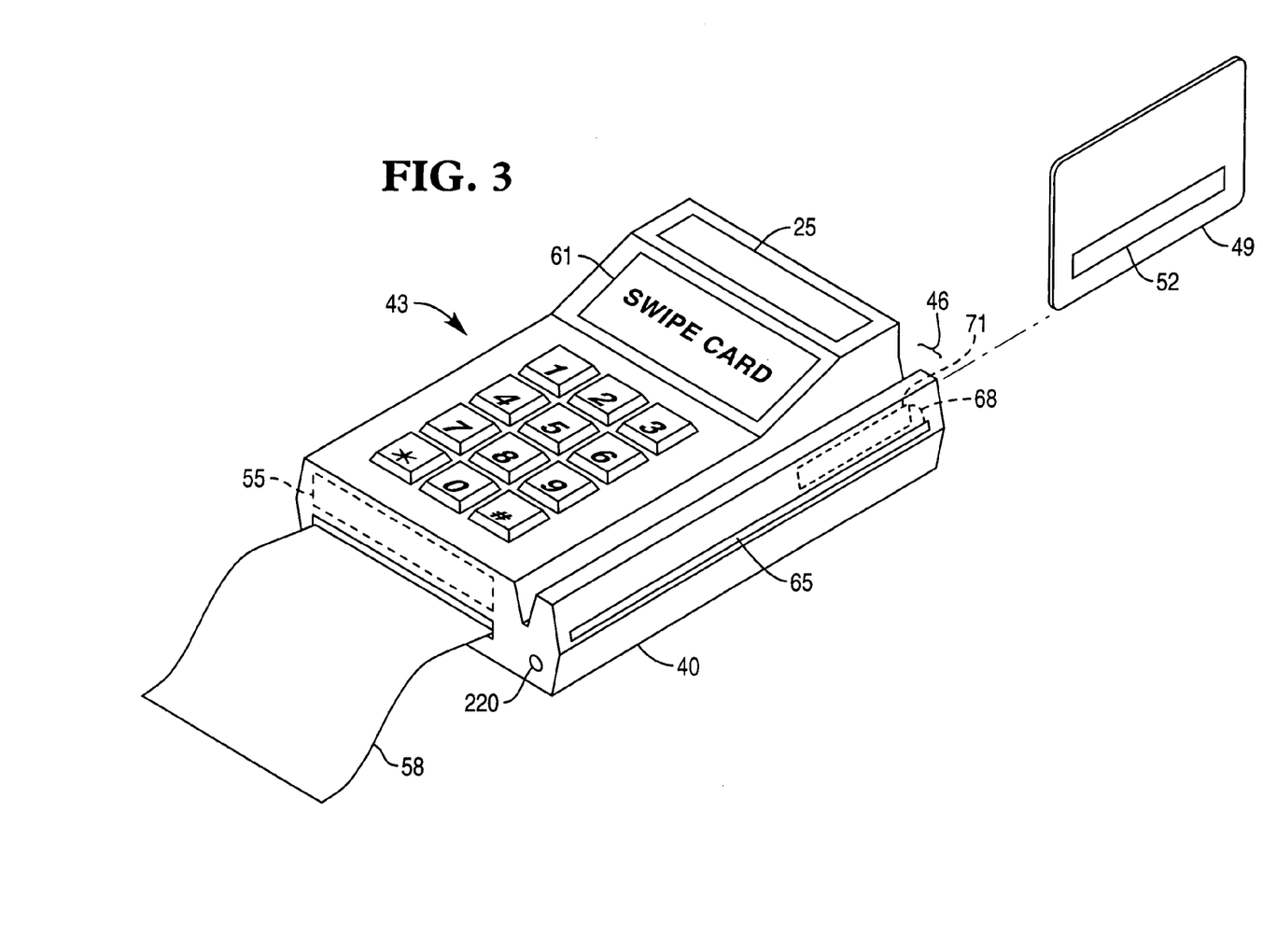
FIG. 3 illustrates another form of the invention.

FIG. 1 is a schematic illustration of one form of the invention, showing an implementation which embodies individual, separate components, for ease of explanation. A more compact, modular, implementation is illustrated in FIG. 3.

In FIG. 1, a portable computer 3 is connected to a magnetic card reader 6, a printer 9, and an acoustic coupler 12. The acoustic coupler 12 functions as a modem, converting binary signals carried on line 15 into acoustic pulses for transmission by a telephone channel. A cordless telephone 18 receives the information represented by the acoustic pulses, and transmits the information to a base unit 21, which is connected to a telephone channel, as indicated.

Figure 2:
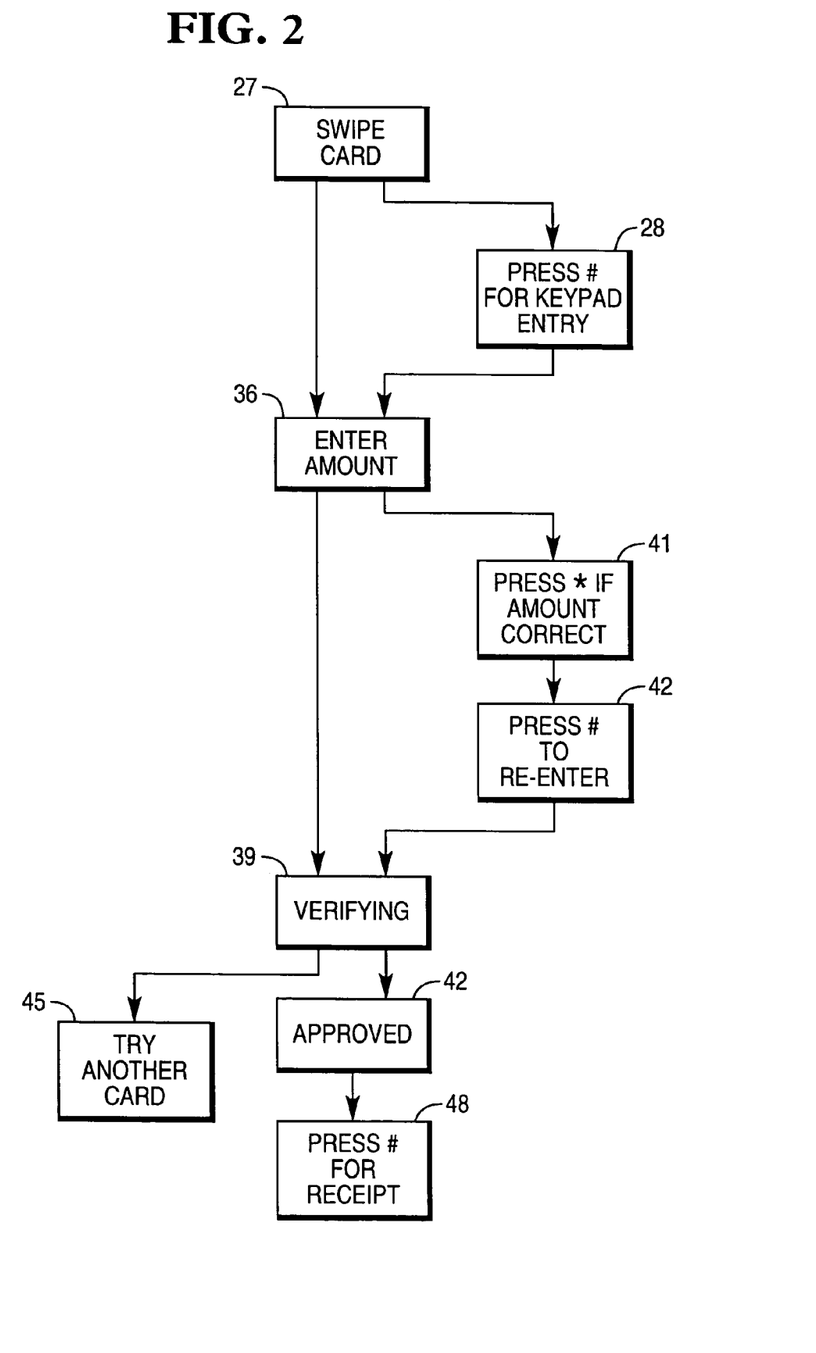
FIG. 2 illustrates a sequence of screens generated by the invention.

The computer 3 is programmed so that, when idle, it continually displays a message on its display 24 which says "SWIPE CARD THROUGH CARD READER," or equivalent, as indicated by screen 27 in FIG. 2. Alternately, a printed sign 25 in FIG. 3 can be affixed to the case of the computer, bearing the same message.

When a user responds to the message, and swipes credit card 30 in FIG. 1 through the reader 6, the reader 6 reads information carried on magnetic stripe 33 of the card 30, which includes an account number, and a code indicating the type of credit card. ("Type of card" refers to the bank clearing system which handles the card's account. Trade names for such systems include "Master Card," "Visa," and so on.)

The display 24 in FIG. 1 may alternate the screen 27 in FIG. 2 with screen 28, which prompts the user to manually enter the credit card number by way of keyboard 29 in FIG. 1. Manual entry is desired when malfunctions occur in the card reader 6 or credit card 30 itself. One example of a malfunction is a defective magnetic stripe 33 on the credit card 30.

When the credit card number is obtained, the reader 6 produces a signal informing the computer 3 of this fact, as known in the art. Based on the type of card, the computer 3 retrieves, from its memory, not shown, the telephone number of (a) an appropriate credit verification service, or (b) the issuer of the credit card. The computer 3 dials this telephone number, and establishes a data connection with the service.

The computer 3 then displays the message indicated on screen 36 in FIG. 2, prompting the user to enter the monetary amount of the transaction, which is to be billed to the account represented by credit card 30. This amount can be echoed on display 24, and the user prompted to verify its accuracy, or re-enter the number if incorrect, as indicated by blocks 41 and 42 FIG. 2.

The computer 3 transmits this amount to the service, while displaying the message indicated in screen 39 in FIG. 2, which indicates that the transaction is presently in-process. If the service accepts the amount, the computer 3 displays screen 42. If the service rejects the amount, the computer 3 prints screen 45, prompting the user to try another credit card.

The computer 3 then displays screen 48 in FIG. 2, which prompts the user to request a paper receipt, which is printed by printer 9 in FIG. 1. The customer may be requested to sign this receipt, as evidence of the transaction.

FIG. 3 illustrates a more compact version of the invention, wherein all the components of FIG. 1 are contained within a single housing, which is approximately the size of an average human hand, or double that size. Terminal 40 contains a keypad 43, which contains only the 12 keys of a standard touch-tone telephone (that is, keys labeled "1" through "0," "#" and "*"). Alternately, the keypad 43 is identical to the keypad used on a standard Automated Teller Machine (ATM). In either case, the keypad 43 contains a restricted character set, and does not contain a full alphanumeric character set, such as is found in a QWERTY keyboard. The keypad 43 is a numeric keypad, as opposed to an alphanumeric keyboard. Preferably, the keypad contains between about 10 and 15 keys.

The terminal 40 also contains a card reader 46, known in the art, through which a credit card 49 can be swiped, and which reads a code contained on a magnetic stripe 52 carried by the credit card 49.

The terminal 40 contains a printer, indicated by phantom block 55, which produced a receipt 58. The terminal 40 also contains a display 61, such as a liquid crystal display. In addition, the terminal 40 carries an antenna 65, which can take the form of an aluminum strip fastened to the terminal's housing. Connected to the antenna, by line 68, is a wireless modem 71. The antenna 65 allows the terminal 40 to communicate with a base station 21, shown in FIG. 1.

The terminal 40 performs seven major functions:

1. It reads a credit card, using a card reader.
2. By wireless means, it establishes a data connection with a verification service.
3. It accepts a key-punched monetary amount from an operator.
4. It relays the monetary amount to the verification service, which processes the amount appropriately.
5. It receives an acceptance or rejection from the verification service.
6. It informs the operator of the result.
7. It prints a receipt for a customer to sign.

Figure 4:
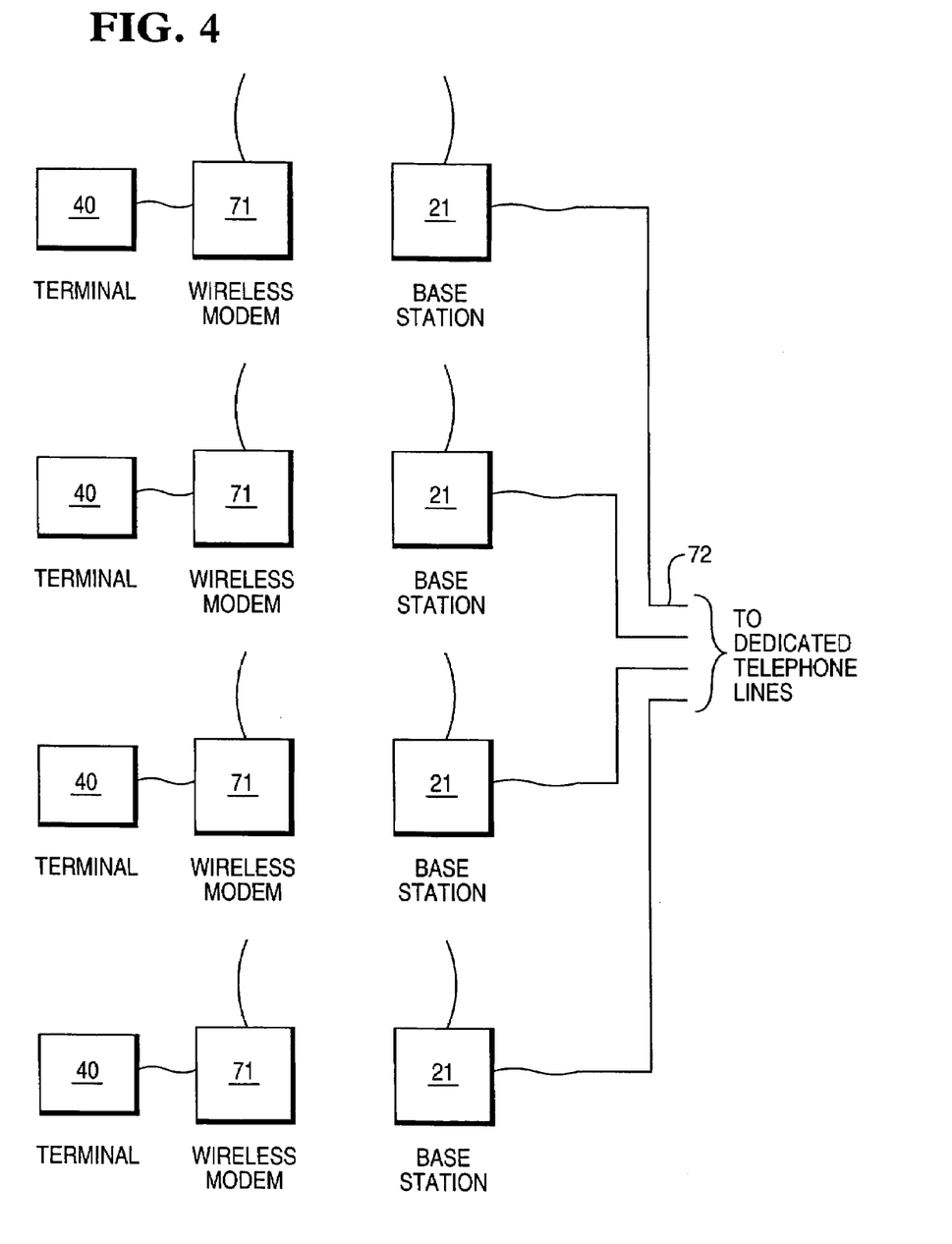
FIG. 4 illustrates another form of the invention.
Figures 4A, 8:
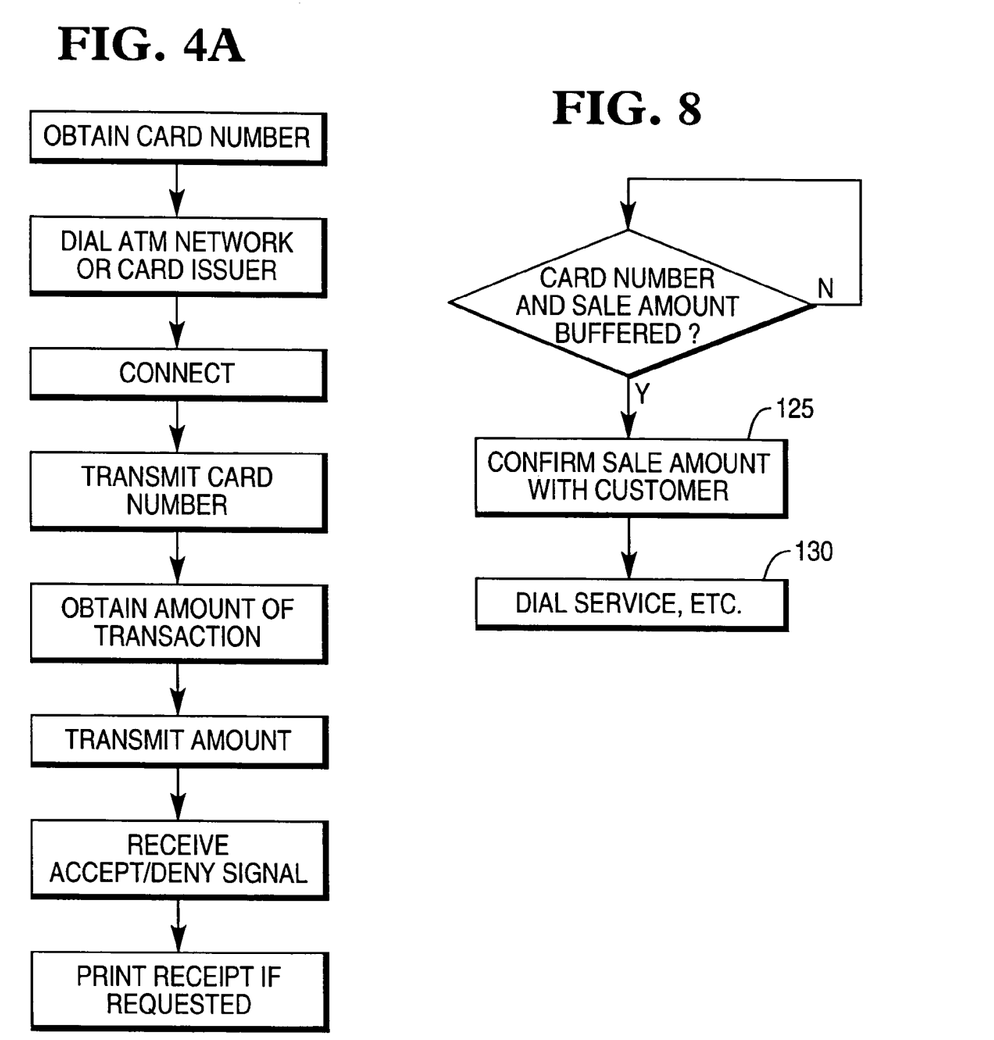
FIG. 4A is a flow chart illustrating logic executed by one form of the invention.
FIGS. 8 and 9 illustrate logic executed by another form of the invention.

FIG. 4A illustrates these steps in flow-chart format.

The massive computing capability of the computer 3 in FIG. 1 can be incorporated into terminal 40 in FIG. 3, by means of a single-board computer. Miniature single-board computers, based on an architecture designed around the 8XX86 microprocessor produced by INTEL Corporation, Santa Clara, Calif., are available from Octagon Systems, 6510 West 91st Avenue, Westminster, Colo. Using such an off-the-shelf computer will eliminate the cost of developing logic to perform the functions identified above. Further, these single-board computers are themselves quite inexpensive, because they have become a mass-produced commodity item.

However, the single-board computer possesses vastly greater computing power than required by the invention. It is expected that a manufacturer of the invention will eventually wish to replace the single-board computer with dedicated logic. In sufficient quantities, such dedicated logic will perhaps be less expensive than even the mass-produced single-board computer. It is to be recognized that the invention is not limited to a particular implementation of the logic which executes the functions described above, partly because numerous different implementations are possible.

ADDITIONAL CONSIDERATIONS

1. It was stated above that the terminal 40 of FIG. 3 dials the telephone number of a verification service. In one embodiment, the verification service is reached by dialing into an Automated Teller Machine (ATM) network, such as that operating under the trade name CIRRUS, NOVUS, PLUS, and so on.

One characteristic of the ATM network is that it can be reached only through dedicated telephone channels. That is, even though the terminal 40 dials a standard telephone number, that number is only accessible by a given terminal 40, and no other terminals or parties. Restated, a dedicated telephone channel can be viewed as connecting two telephones, A and B. Telephone A can call telephone B, and, conversely, telephone B can call telephone A. However, no other telephones, other than B, can call A, and no telephones, other than A, can call telephone B.

Of course, other types of dedicated lines are available, such as where three telephones can call each other, but cannot receive calls from others. A major feature of dedicated telephone lines is that they do not accept incoming calls from telephones other than those to which the lines are dedicated. The dedicated lines prevent hackers from gaining access to the ATM network.

2. It is not necessary that the dedicated lines connect to an ATM network, but can connect directly to the verification service. However, it is perhaps more convenient to call the ATM network, because the ATM can act as a clearing house for multiple credit cards. That is, a single telephone number (that of the ATM network) is used for all credit cards. The terminal 40 need only store a single telephone number.

3. One embodiment of the invention is shown in FIG. 4, and would be expected to be used in a restaurant or club. Multiple terminals 40 are shown, and each utilizes a wireless modem 71. Each wireless modem 71 communicates with a respective base station 21. Each base station 21 connects to a dedicated telephone line 72. That is, the restaurant or club is supplied by multiple dedicated telephone lines.

With this arrangement, multiple terminals 40 can be used simultaneously, so that restaurant patrons need not queue up to wait for a free terminal 40.

Figure 5:
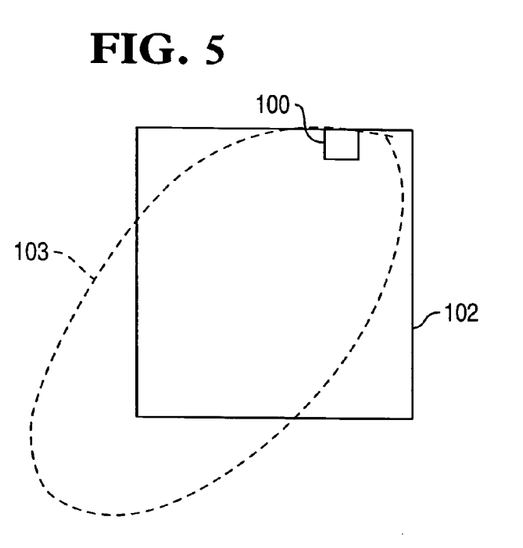
FIG. 5 illustrates a directional antenna 100 contained within a building 102.

4. A high degree of security is obtained by the use of dedicated telephone lines. Additional security can be obtained by measures such as the following:

(A) A highly directional antenna 100 in FIG. 5 can be used for each base station, thereby limiting reception to signals transmitted by terminals 40 located within the antenna's lobe 103. Reception from terminals outside the lobe 103 is not likely. Directional antennas are known in the art.

Figure 6:
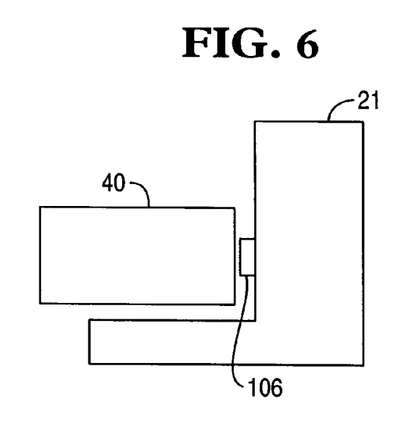
FIG. 6 illustrates a base station 21 to which a portable terminal 40 docks, and a proximity detector 106 which detects docking.

(B) Each base station 21 can act as a docking station for its terminal 40, as shown in FIG. 6. When the terminal is docked, and inactive, a proximity detector 106 detects the presence of the terminal 40, and prevents the base station from receiving any signals whatsoever. Thus, for a hacker to contact a base station 21, the terminal 40 must be removed from the proximity sensor 106.

Figure 7:
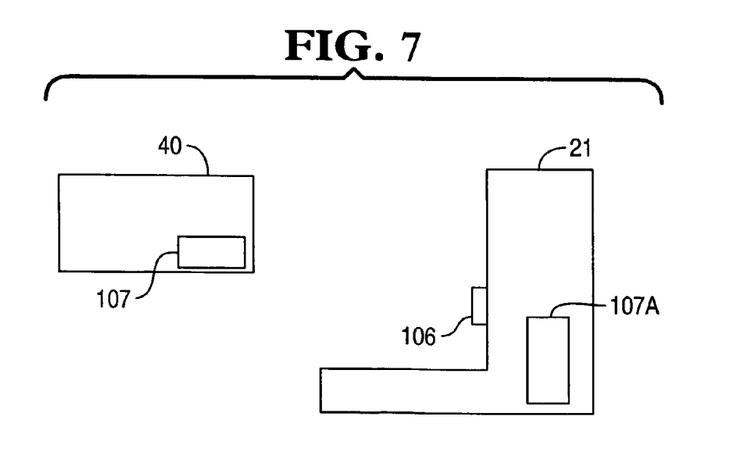
FIG. 7 illustrates a radio-frequency transmitter 107 which transmits a code to a receiver 107A.

(C) When a terminal 40 in FIG. 7 is removed from a base station 21, the terminal detects the removal and broadcasts a coded signal by a transmitter 107, which is separate and independent from the wireless modem (not shown in FIG. 7). The coded signal is analogous to the signal broadcast by a common remote garage door opener.

The base station 21 only accepts signals from a wireless modem 71 when the coded signal is being received. If the coded signal contains, for example, 20 bits, then $2^{20}$ possible combinations exist, which represent a significant obstacle for a hacker to overcome. Further, the coded signal can be changed periodically.

(D) Repeating part of points (B) and (C), a base station 21 only accepts signals from a terminal 40 when two conditions occur together:

(i) the proximity sensor 106 indicates that the terminal 40 is not docked, and (ii) the coded signal assigned to the base station is being received.

5. The invention can be used without instruction from a teacher. That is, any person who can read, and has the physical ability to operate the keypad 43 in FIG. 3, and to swipe the card 49 through the card reader 46, can operate the invention, without resort to a teacher or a reference manual.

One reason is that only four actions are required of the person:

(i) reading the display 27 in FIG. 2, which says "Swipe card," or "Swipe card through reader;"

(ii) swiping the card;

(iii) reading the display 27, which says "Enter amount;"

(iv) entering the amount on the keypad 43 in FIG. 3.

Execution of these four actions, in the proper sequence, is self-explanatory, based on the display 27. The terminal 40 is self-teaching, as to the actions required by the user.

The Inventor observes that self-service gasoline stations exist in the United States, where customers present a credit card to a card reader, and dispense their own gasoline. These stations prove that such credit card terminals can be self-teaching.

6. Further simplification of operation can be obtained by eliminating the requirement of a sequence of operations. That is, as indicated in FIG. 8, the logic executed by the invention continually cycles through the "NO" loop, until both the card number and the amount of the sale have been entered, and buffered. However, the order, or sequence, in which these two events occur is not significant.

After the two events both occur, as indicated by block 125, the invention prints the amount entered on display 61 in FIG. 3, and asks whether the amount is correct. If so, the invention proceeds to call the ATM network, as usual, as indicated by block 130.

In this embodiment, the user need not be concerned with the order of (i) swiping the card and (ii) entering the amount.

7. Because of the simplicity of the invention, it is possible to allow customers to perform part of the billing operation, thereby releasing the waiter from several tasks.

Figure 9:
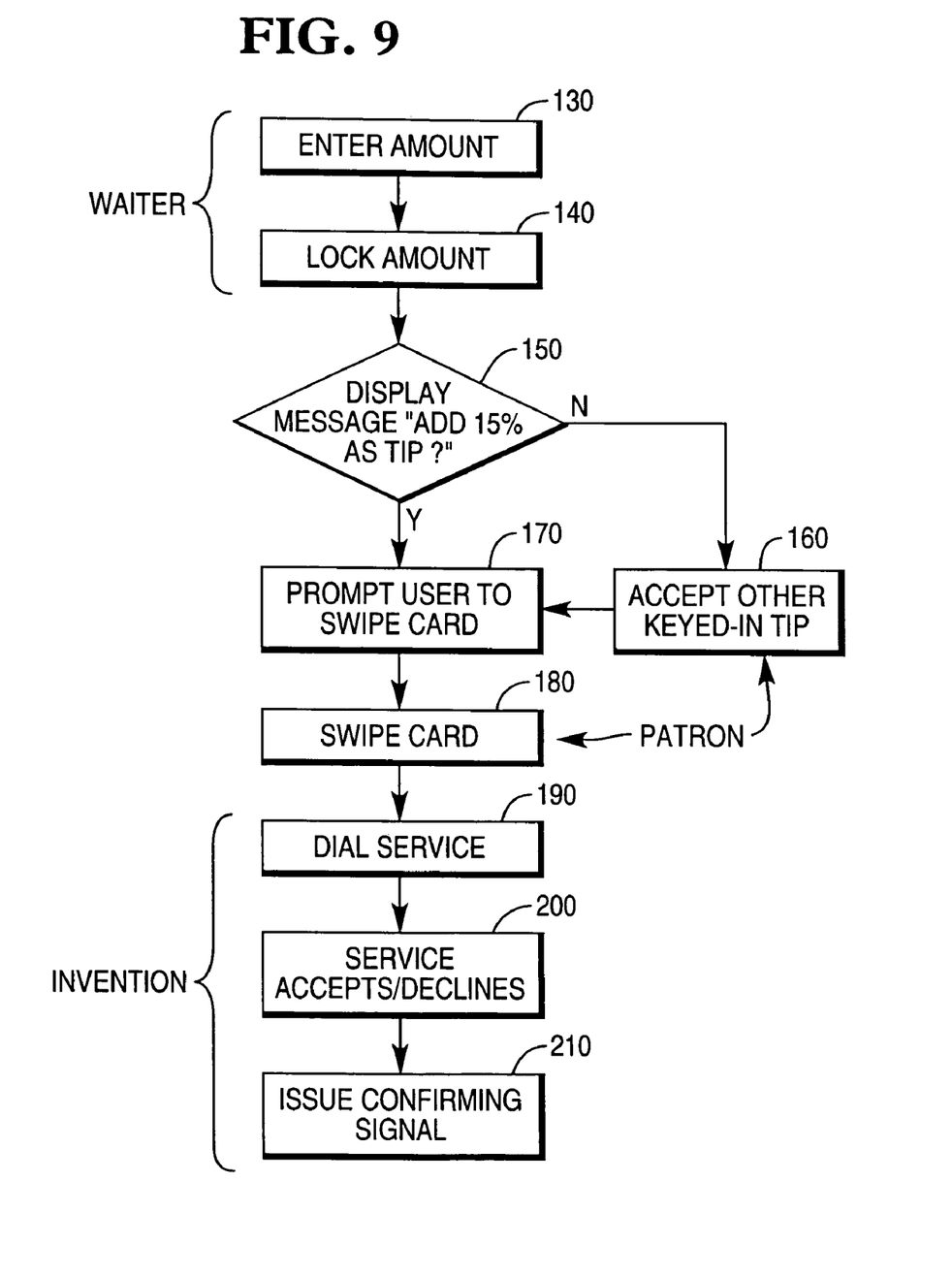

For example, when a restaurant patron requests a bill, a waiter enters the amount of the patron's bill into the terminal 40 of FIG. 3, as indicated by block 130 in FIG. 9. The invention is designed such that the amount entered by the waiter cannot be changed by the customer, as indicated by block 140.

For example, the terminal 40 can initially display the message "Enter Amount." After the amount is entered, the terminal displays the message "Press * then # to lock." When the waiter presses the *-key and then the #-key, the entered amount is stored into a buffer, and cannot be changed thereafter.

If, for some reason, the amount must be changed, several approaches can be used. In one approach, a lengthy number sequence can be entered to unlock the terminal 40. Alternately, the terminal can be programmed such that it remains locked, but for a period of ten minutes, after which time it cancels the amount, and re-initializes itself. In this alternate approach, the waiter sets aside the locked terminal, and uses one of the other terminals 40 in FIG. 4. As another approach, a physical key can unlock a physical pin-tumbler lock (neither shown), which actuates a switch, which re-sets the terminal.

The waiter presents the locked terminal 40 to the patron. The terminal displays a message asking whether the patron wishes to add a tip to the bill, as by suggesting an additional fifteen percent be added, as indicated in block 150. If the patron wishes to leave a different tip, block 160 is reached, wherein the patron keys in a desired amount.

When block 170 is reached, the terminal requests that the patron swipe a credit card, and proceeds with the logic indicated in blocks 190 and 200.

After the verification service accepts the charges and applies them to the credit card account, the service informs the terminal of this fact. The terminal then issues a visible signal. For example, each terminal can be equipped with a light 220 in FIG. 3. When a locked terminal is presented to a patron, the light shines red. After the confirming signal of block 210 is FIG. 9 is received, the light changes to green. In different embodiments, the light is preferably visible at distances of 10, 20, 30, 40, and 50 feet.

Waiters in restaurants will look for patrons leaving their tables, and check the color of the lights on the terminals.

Alternately, each terminal can issue a unique coded radio signal, as the confirming signal of block 210 in FIG. 9, which is received by a central receiver staffed by a cashier. The cashier thus learns of the completion of each transaction by each terminal. In addition, the cashier can be equipped with a bank of lights, each of which indicates the status (red or green) of the individual terminals 40.

Because the customer is allowed to add a tip to the amount locked in the terminal, then, in one sense, the terminal is not strictly "locked." However, this apparent anomaly can be resolved in several ways. One is to lock the amount against reduction, but to allow the amount to be increased by the customer. Another is to keep the amount locked, and treat the customer's tip as a second amount. The terminal 40 then verifies two amounts with the verification service.

8. The discussion above has been framed in terms of billing in restaurants. Of course, the invention is not limited to use in restaurants.

Figure 10:
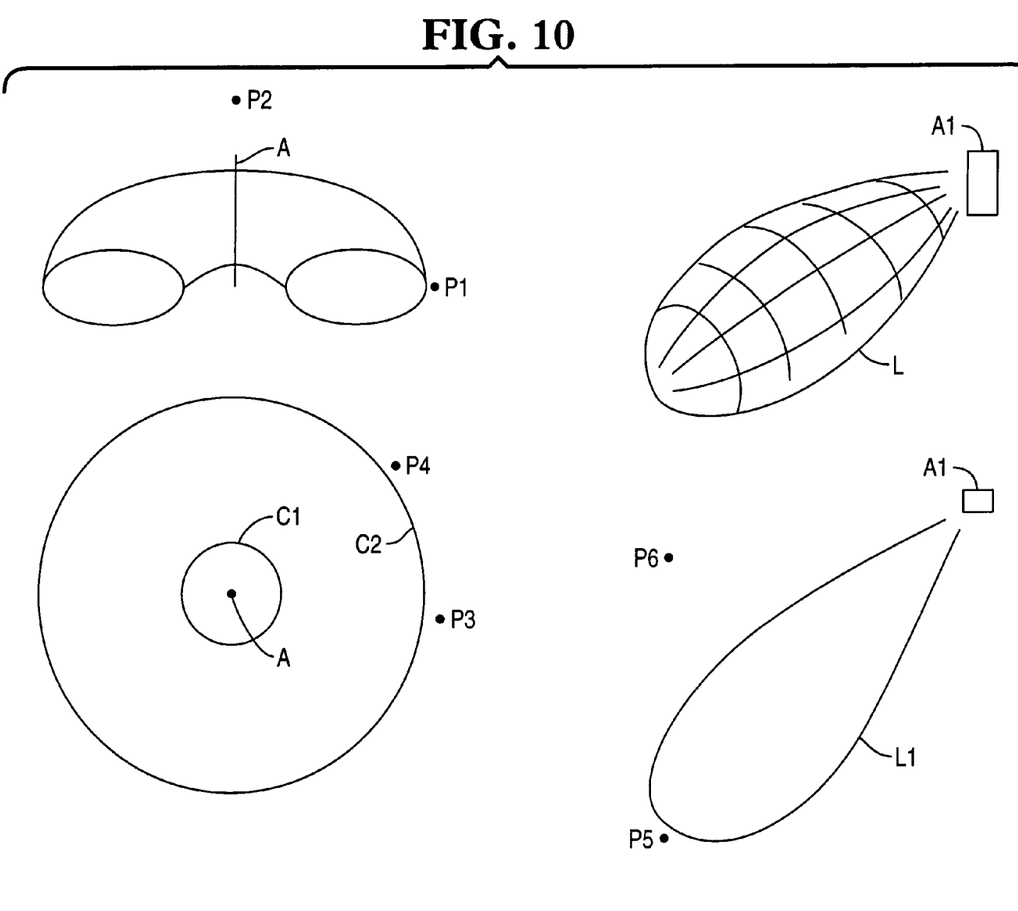
FIG. 10 illustrates directional, and non-directional, antennas.

9. A directional antenna was discussed above. The term "directional" refers to the horizontal plane. For example, FIG. 10 illustrates the radiation pattern of a short dipole antenna A. The pattern resembles a doughnut. It could be considered "directional," in the sense that the field strength at point P1 is different from that at point P2.

However, in the horizontal plane, the radiation pattern is concentric, as indicated by circles C1 and C2. The field strength at points P3 and P4, equidistant from antenna A, are identical.

Lobe L illustrates the radiation pattern of one type of directional antenna A1. Lobe L1 is a horizontal cross section. Points P5 and P6, equidistant from antenna A1, receive different field strengths.

In another form of the invention, the antenna of the base station 21 takes the form of a wire (not shown) which runs along the ceiling of the restaurant.

10. The term "card reader" refers to a device for reading information encoded upon a passcard, such as a credit card.

11. The following U.S. patents are hereby incorporated by reference:

| | | |
|---|---|---|
| 5,221,838 | Gutman et al. | Jun. 22, 1993 |
| 5,334,821 | Campo et al. | Aug. 2, 1994 |
| 5,294,782 | Kumar | Mar. 15, 1994 |
| 4,341,951 | Benton | Jul. 27, 1982 |
| 4,454,414 | Benton | Jun. 12, 1984 |
| 4,812,632 | Kakinuma et al. | Mar. 14, 1989 |
| 4,877,947 | Mori | Oct. 31, 1989 |
| 5,050,207 | Hitchcock | Sep. 17, 1991 |
| 5,157,717 | Hitchcock | Oct. 20, 1992 |
| 5,322,991 | Hanson | Jun. 21, 1994 |

Numerous substitutions and modifications can be undertaken without departing from the true spirit and scope of the invention. What is desired to be secured by Letters Patent is the invention as defined in the following claims.

What is claimed is:

1. A portable terminal, comprising:
   a) a keypad containing between 10 and 15 keys;
   b) a card reader;
   c) a wireless modem for communicating with a local base station connected to a telephone line;
   d) a display;
   e) logic means for
      i) accepting data from the card reader and the keypad; and
      ii) transmitting said data to a base station, using said wireless modem
   and which comprises means for
      iii) issuing messages on said display which instruct the user to
         A) present a card to the card reader and
         B) enter a monetary amount using the keypad; and
   f) a printer for printing a paper receipt.

2. Terminal according to claim 1, and further comprising:
   g) means for transmitting a code which identifies said terminal to said base station.

3. Terminal according to claim 1, and further comprising:
   g) means for detecting when a remote verification service signals acceptance of said monetary amount as a charge against an account, and
   h) means for illuminating a light which is visible for at least 20 feet, in response to said acceptance.

4. A system, located within a building, comprising:
   a) multiple base stations, each linkable to a respective dedicated telephone channel;
   b) multiple portable terminals, each comprising
      i) modem means for wireless communication with a base station;
      ii) a card reader;
      iii) a keypad containing between about 10 and 15 keys;
      iv) a display;
      v) logic means, coupled to the modem means, card reader, keypad, and display, for
         A) issuing a message on the display requesting a user to present a card to the card reader;
         B) issuing a message on the display requesting the user to enter a monetary amount via the keypad; and
         C) transmitting data read from the card and the monetary amount to a remote agency, via the modem means.

5. In a portable terminal which reads data from a credit card, transmits said data in a wireless manner to a remote station, and which contains a display, the improvement comprising:
   a) means for loading a monetary amount into the terminal, and displaying said monetary amount to a customer;
   b) means for preventing said customer for reducing said monetary amount; and
   c) means for responding to input from the customer, and, in response, transmitting said data and said monetary amount to the remote station.

6. Terminal according to claim 5, and further comprising:
   d) means for allowing said customer to add a second monetary amount to said monetary amount.

7. A method of transmitting data to a system which maintains accounts of credit transaction, comprising the following steps:
   a) presenting a wireless terminal to a customer, which
      i) issues a message requesting presentation of a credit card;
      ii) reads card data from a credit card, when presented;
      iii) issues a message requesting entry of a monetary amount;
      iv) accepts said monetary amount from a keypad;
      v) transmits said monetary amount and said card data to said system; and
      vi) prints a receipt for the customer.

8. A credit card verification device, comprising:
   a) means for instructing a person, who has never seen said device previously, how to successfully
      (i) enter a credit card number into the device and
      (ii) enter a monetary amount into the device;
   b) means for transmitting said number and said amount, using a wireless modem, to a verification service; and
   c) means for indicating to said customer whether said verification service accepts said amount.

9. Method according to claim 7, in which the data is carried by an ATM network during part of its travel to the system which maintains accounts of credit transactions.

10. A portable terminal according to claim 1, wherein
    i) the portable terminal docks with the base station; and
    ii) the base station detects docking and, in response, disables the wireless modem.

11. A portable terminal according to claim 1, wherein
    i) the portable terminal transmits a status code when not docked with the base station; and
    ii) the base station accepts data from the portable terminal, on the wireless modem, only when the status code is being received by the base station.

12. A portable terminal according to claim 1, wherein
    i) a transmitter is associated with the portable terminal, and transmits a status code independent of the wireless modem; and
    ii) a receiver is associated with the base station, and receives the status code from the transmitter, independent of the wireless modem.

13. A portable terminal according to claim 12, wherein
    iii) the transmitter transmits the status code when the portable terminal is separated from the base station; and iv) the base station accepts signals from the wireless modem only when the receiver receives the status code.

14. A portable terminal according to claim 1, wherein i) the two messages are alternately and continuously presented to the customer, until    A) a first predetermined event occurs, whereupon presentation of one message terminates; and    B) a second predetermined event occurs, whereupon presentation of the other message terminates.

15. A portable terminal according to claim 14, wherein iii) one predetermined event comprises entry of a monetary amount into the keypad, and iv) the other predetermined event comprises swiping of a credit card through the card reader.

16. A portable terminal according to claim 1, wherein no other messages requesting action by a user are presented, other than those of paragraph (e)(iii).

* * * * *